United States Patent [19]

Roy et al.

[11] Patent Number: 5,515,292

[45] Date of Patent: May 7, 1996

[54] CIRCUIT ACTIVITY DRIVEN STATE ASSIGNMENT OF FSMS IMPLEMENTED IN CMOS FOR LOW POWER RELIABLE OPERATIONS

[75] Inventors: Kaushik Roy, West Lafayette, Ind.; Sharat Prasad, Dallas, Tex.

[73] Assignee: Texas Instruments Incorporated, Dallas, Tex.

[21] Appl. No.: 129,816

[22] Filed: Sep. 29, 1993

[51] Int. Cl.$^6$ ........................................ G06F 15/00
[52] U.S. Cl. .................. 364/489; 364/578; 395/500
[58] Field of Search ........................ 364/488, 489, 364/490, 578; 395/500; 257/204; 326/46, 81, 108; 327/185, 210

[56] References Cited

U.S. PATENT DOCUMENTS

| | | | |
|---|---|---|---|
| 5,097,151 | 3/1992 | Eerenstein et al. | 307/465 |
| 5,317,757 | 5/1994 | Medicke et al. | 395/800 |

OTHER PUBLICATIONS

Ghosh et al., "Estimation of Average Switching Activity in Combinational and Sequential Circuits", IEEE 1992, pp. 253–259.

Nagj, "Transition Density: A Now Measure of Activity in Digital Circuit", IEEE 1992, pp. 310–323.

Pasbt et al., "Experiments on the Synthesis and Testability of Non-Scan Finite State Machines", IEEE 1992, pp. 537–542.

Villa et al., "Nova: State Assignment of Finite State Machines for Optimal Two-level Logic Implementation", IEEE 1990, pp. 905–924.

Srinivas Devadas, et al., "Mustang: State Assignment of Finite State Machines Targeting Multilevel Logic Implementations", IEEE Trans on Computer Aided Design, vol. 7, No. 12, Dec. 1988, pp. 1290–1300.

Kaushik Roy and Sharat Prasad, "SYCLOP: Synthesis of CMOS Logig for Low Power Applications", International Conference on Computer Design, Boston, Oct. 11–14, 1992.

*Primary Examiner*—Vincent N. Trans
*Assistant Examiner*—Tan Q. Nguyen
*Attorney, Agent, or Firm*—Jacqueline J. Garner; Richard L. Donaldson; William E. Hiller

[57] ABSTRACT

A method for optimizing a circuit containing a finite state machine (FSM) based on transition density. A first state assignment is assigned for each state. Then, a first transition density characteristic associated with the first state assignment is determined and a second state assignment, different from said first state assignment is assigned for each state. A second transition density characteristic associated with the second state assignment is then determined and the first state assignment is set equal to the second state assignment if second transition density characteristic is less than a predetermined amount. The process is repeated until the transition density has been minimized.

14 Claims, 3 Drawing Sheets

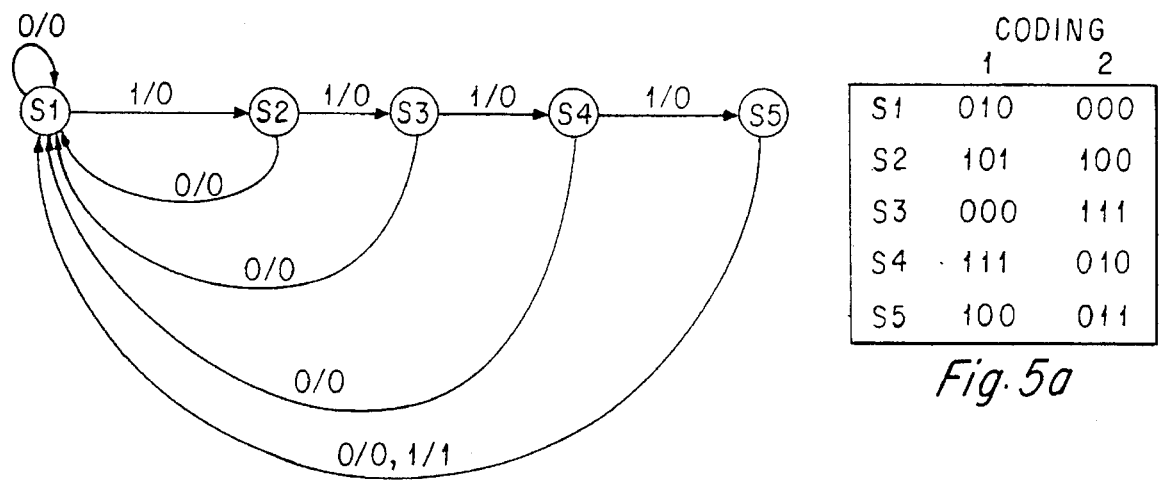
Fig. 5
Fig. 5a
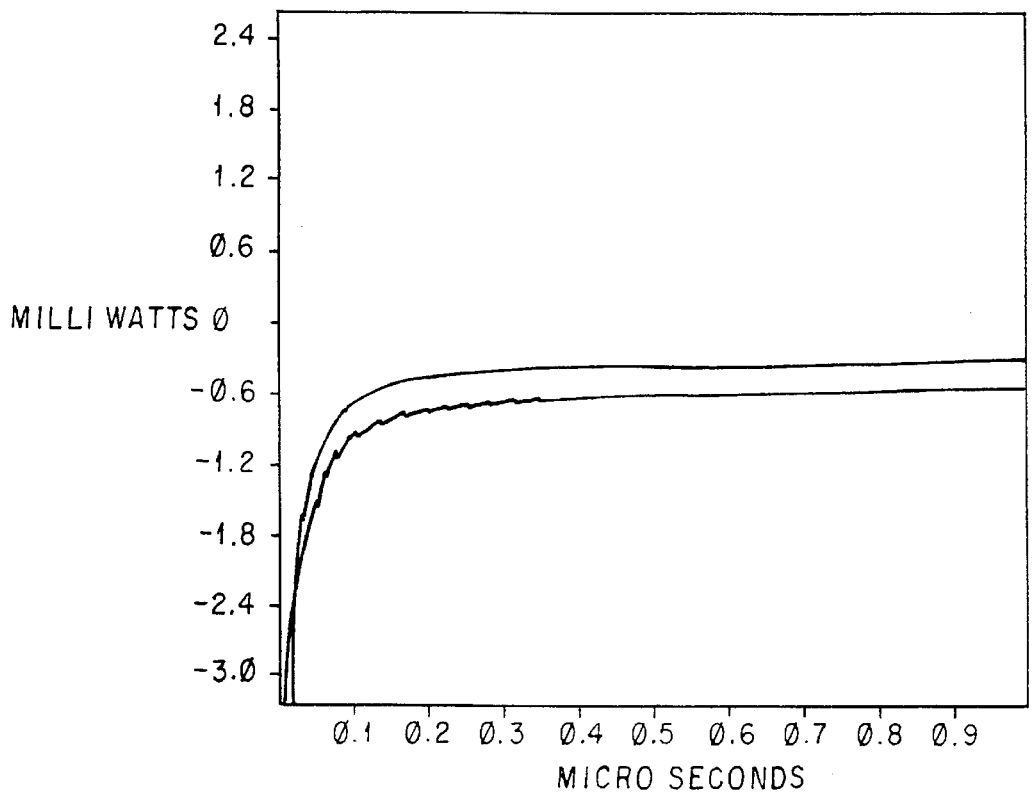
Fig. 6 a
CIRCUIT ACTIVITY DRIVEN STATE ASSIGNMENT OF FSMS IMPLEMENTED IN CMOS FOR LOW POWER RELIABLE OPERATIONS

FIELD OF THE INVENTION

This invention generally relates to finite state machine (FSM) synthesis and more specifically to circuit activity driven state assignment of FSMs for low power reliable operations.

BACKGROUND OF THE INVENTION

Finite state machine (FSM) and combinational logic synthesis have been conventionally targeted to reducing the area and the critical path delay. Recently, testability has also been considered. However, power dissipation considerations have received little attention. The minimization of power in CMOS circuits is of extreme importance, especially for portable operations. As the number of devices on a chip increases, the heat dissipation requirements can become prohibitively large. Power dissipation in CMOS circuits has traditionally been minimized by scaling down the supply voltage. However, when the supply voltage is scaled down, the circuit performance becomes slower. The slower performance can be compensated for by using scaled down device features, but several other effects such as dominant interconnect capacitance becomes very important. Accordingly, there is a need for FSM synthesis that also minimizes power dissipation.

SUMMARY OF THE INVENTION

A method for optimizing a circuit containing a finite state machine (FSM) is disclosed. The method is based on the concept of choosing a state assignment for each state of the FSM such that transition density is minimized. In one embodiment, a first state assignment is assigned for each state. Then, a first transition density characteristic associated with the first state assignment is determined and a second state assignment, different from said first state assignment is assigned for each state. A second transition density characteristic associated with the second state assignment is then determined and the first state assignment is set equal to the second state assignment if second transition density characteristic is less than a predetermined amount. The process is repeated until the transition density has been minimized.

An advantage of the invention is providing FSM synthesis that minimizes power dissipation.

Another advantage of the invention is providing FSM synthesis that minimizes transition density.

BRIEF DESCRIPTION OF THE DRAWINGS

In the drawings:

FIG. 5 is an example state machine on which the preferred embodiment of the invention may be practiced;

FIG. 5a is a table of coding examples for the state machine of FIG. 5; and

FIG. 6 is a graph of a spice simulation showing the results of optimization according to the preferred embodiment of the invention.

Corresponding numerals and symbols in the different figures refer to corresponding parts unless otherwise indicated.

DETAILED DESCRIPTION OF PREFERRED EMBODIMENTS

In a CMOS circuit, power is dissipated only when there is a transition (a ZERO to ONE or ONE to ZERO in logic value) at the output of a gate and is given by $$V_{DD}^2 \cdot f \cdot C,$$

where C is the capacitive bad and f denotes the frequency of operation with a supply voltage of $V_{DD}$. However, frequency is not well-defined for non-periodic signals. Hence, f can be expressed in terms of $$\frac{n_x}{T},$$

where $n_x$ is the number of transitions at node x in time $$\frac{-T}{2} \text{ and } \frac{+T}{2}.$$

Frequency, f in this situation is defined as transition density. Transition density is a measure of the average switching rate at any node of a circuit. Given the input signal transition probabilities, accurate transition densities at any node of a multilevel circuit can be obtained by logic simulation. The rate at which node transition occurs is also a measure of the stress that can cause failures in digital circuits. Hence, the circuits synthesized using transition density measure are less susceptible to run time failures.

Figure 1:
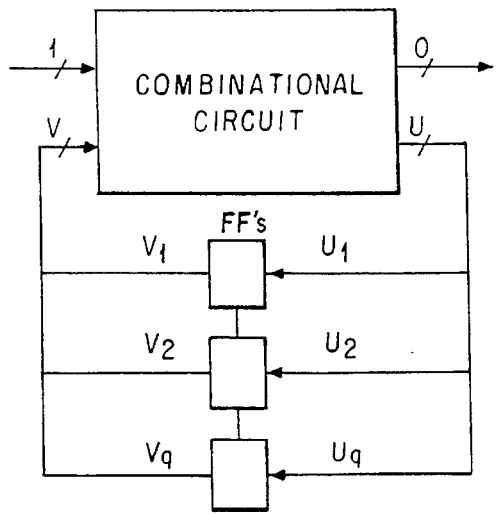
FIG. 1 is a generic block diagram of circuits that may be optimized according to the preferred embodiment of the invention.

The synthesis process of the preferential embodiment consists of two parts: state assignment which determines the combinational logic function, and multilevel optimization of the combinational logic based on transition density measure. The state assignment scheme considers the likelihood of state transitions—the probability of a state transition (from state $S_1$ to state $S_2$) when the primary input signal probabilities are given. An input signal probability is given by the fraction of time a logical ONE appears at that input. The state assignment minimizes the total number of transitions occurring at the v inputs (or the present state inputs) of the state machine shown in FIG. 1. Multilevel combinational logic is synthesized from two-level expressions by a factorization scheme which tries to minimize area while at the same time trying to reduce the transition densities at the internal nodes of the circuit. The optimization process is iterative. During each iteration, the best sub-expression from among all promising common sub-expressions, is selected. The activity number is based on both area and power savings. The selected sub-expression is factored out of all affected expressions. The iteration is continued until no further savings can be realized. The synthesis technique can handle input signal probabilities and transition densities, and hence, a particular circuit can be optimally synthesized in different ways suited for different applications requiring different types of inputs.

Figure 2:
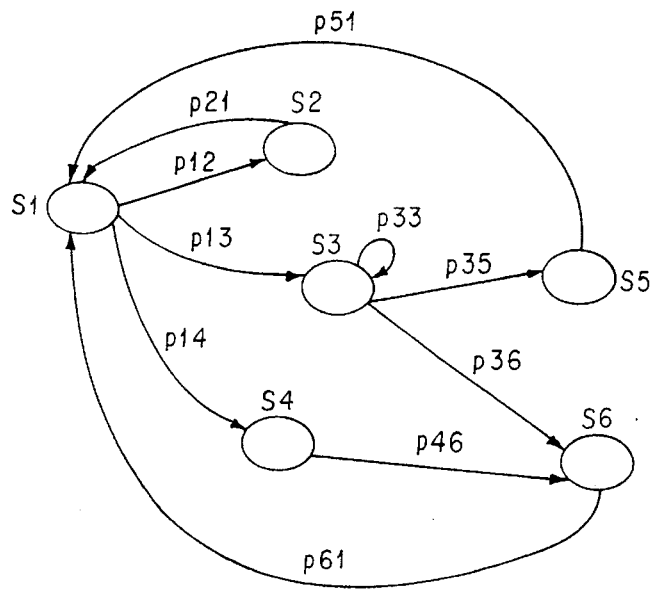
FIG. 2 is a Probabilistic State Transition Graph of a set of nodes to be optimized according to the preferred embodiment of the invention.

Finite state machines (FSMs) may be represented by Probabilistic State Transition Graphs (PSTGs). A PSTG is shown in FIG. 2. PSTGs are directed graphs consisting of a set of nodes S and a set of edges E. Each node $S_i \epsilon S$ represents a state of the FSM. There is a directed edge $S_i\text{-}S_j$ between nodes $S_i$ and $S_j$ if there exits a set of inputs I, which when applied to the machine at state $S_i$ produces a transition from state $S_i$ to state $S_j$ with output O. Hence, each edge is associated with a label $L_{ij}$ which carries information on the values of primary inputs that caused the transition and the value of the primary outputs corresponding to the state transition. Each edge is also associated with a number $p_{ij}$, $0 \leq p_{ij} \leq 1$, which denotes the conditional probability of a state transition from state $S_i$ to $S_j$, given that the state machine is at state $S_i$, and is directly related to the signal probabilities of the primary input nodes. The cardinality of set S, $N_s$, gives the total number of states in the machine. The number of primary inputs and primary outputs are denoted by $N_I$ and $N_O$ respectively. Completely specified FSMs are used. Hence, if there are k outgoing edges from node $S_j$, each associated with a probability of $P_{jm}$, $m \leq k$, then $$\sum_m p_{jm} = 1$$

If a machine is incompletely specified, then it may be completely specified by introducing a self loop at each state $S_j$ corresponding to the don't care inputs to that state. FIG. 2 shows a state machine with five states where state $S_1$ has three outgoing edges each associated with a transition probability such that $p_{12}+p_{13}+p_{14}=1$. For node $S_3$, $p_{33}+p_{35}+p_{36}=1$.

The state assignment problem involves assigning unique Boolean numbers of same length to different states of an FSM so as to satisfy some given criteria. Given a state assignment, the Hamming distance between any two states $S_i$ and $S_j$ is given by $$H(S_i, S_j) = J(S_i \oplus S_j)$$

where $\oplus$ represents the Exclusive Or operation. The function J (x) determines the number of ONEs in boolean representation of number x. In other words, $H(S_i, S_j)$ denotes the total number of bits that states $S_i$ and $S_j$ differ in. For example, if $S_1$ was assigned the value "010" and $S_2$ was assigned the value "011", $H(S_1,S_2)$ would equal 1.

The signal probability of signal g is given by:

$$P(g) = \lim_{T \to \infty} \frac{1}{2T} \int_{-T}^{+T} g(t)dt$$

In other words, P(g) is a measure of the probability that signal g assumes a logic value of ONE.

The switching rate at a node is given by transition density which is formally defined as follows:

$$D(g) = \lim_{T \to \infty} \frac{n_g(T)}{T}$$

where $n_g(t)$ is the number of transitions of g(t) in the time interval between $$\frac{+T}{2} \text{ and } \frac{+T}{2}.$$

D(g) has the unit of the number of transitions per unit time. Transition density is a measure of activity in a digital circuit. Therefore, it is related to reliability. Hence, the circuits realized to reduce transition density measure may be more reliable.

Logic module M is a multi-input, multi-output logic module which implements a Boolean function. M can be a single logic gate or a higher level circuit block. The inputs to M, $g_1, g_2, \ldots g_n$ are mutually independent companion processes each having a signal probability of $P(g_i)$, and a transition density of $D(g_i)$, $i \leq n$. The signal probability at the output can be easily computed using methods well known in the art. For example, if $P_1$, $P_2$, and $P_3$, are the input signal probabilities to a three input AND gate, the output signal probability is given by $P_1P_2P_3$, whereas, for an OR gate the output signal probability is $1\text{-}(1\text{-}P_1)(1\text{-}P_2)(1\text{-}P_3)$. For an inverter, the output signal probability is simply $(1\text{-}(1\text{-}P_1))$, where $P_1$ is the input signal probability. The transition density at any output $h_j$, of M is given by $$D(h_j) = \sum_{i=1}^{n} P(B(h_j,g_i))D(g_i)$$

where $B(h_j,g_i)$ represents the Boolean difference of $h_j$ with respect to $g_i$. If y is a Boolean function of x, then B(y,x) is given by $$B(y,x) = y|_{x=0} \oplus y|_{x=1} = y(x) \oplus y(\bar{x})$$

Figure 3:
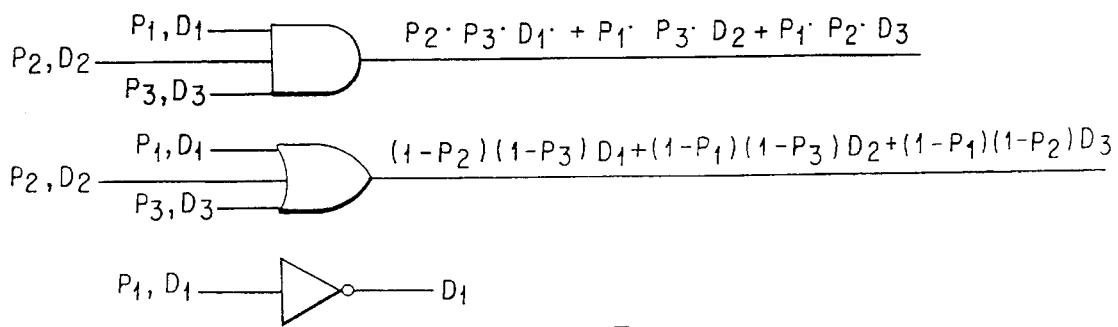
FIG. 3 is a block diagram showing the propagation of transition densities through basic circuit gates.

FIG. 3 shows the propagation of transition density through AND, OR, and NOT gates. The signal probabilities and the transition densities at the primary inputs to a circuit are usually available.

From the above discussions it is clear that the average power dissipation in a CMOS circuit can be written as $$POWER_{avg} = \frac{1}{2} V_{DD}^2 \Sigma C_i D(g_i)$$

summing over all circuit nodes $g_i$. During multilevel logic synthesis process, the capacitive load $C_i$ at each node of a circuit is approximated by the fanout factor at that node. Power dissipation measure $\Phi$ is defined as $$\Phi = \sum_{i \epsilon R} \text{fanout}_i D(g_i)$$

where R is the set of all input and internal nodes, and $\text{fanout}_i$ is the number of fanouts at node i. $V_{DD}$ is assumed to be constant for all circuits, and hence, under consideration $\Phi$ is proportional to the average power dissipated in the circuit.

Figure 4:
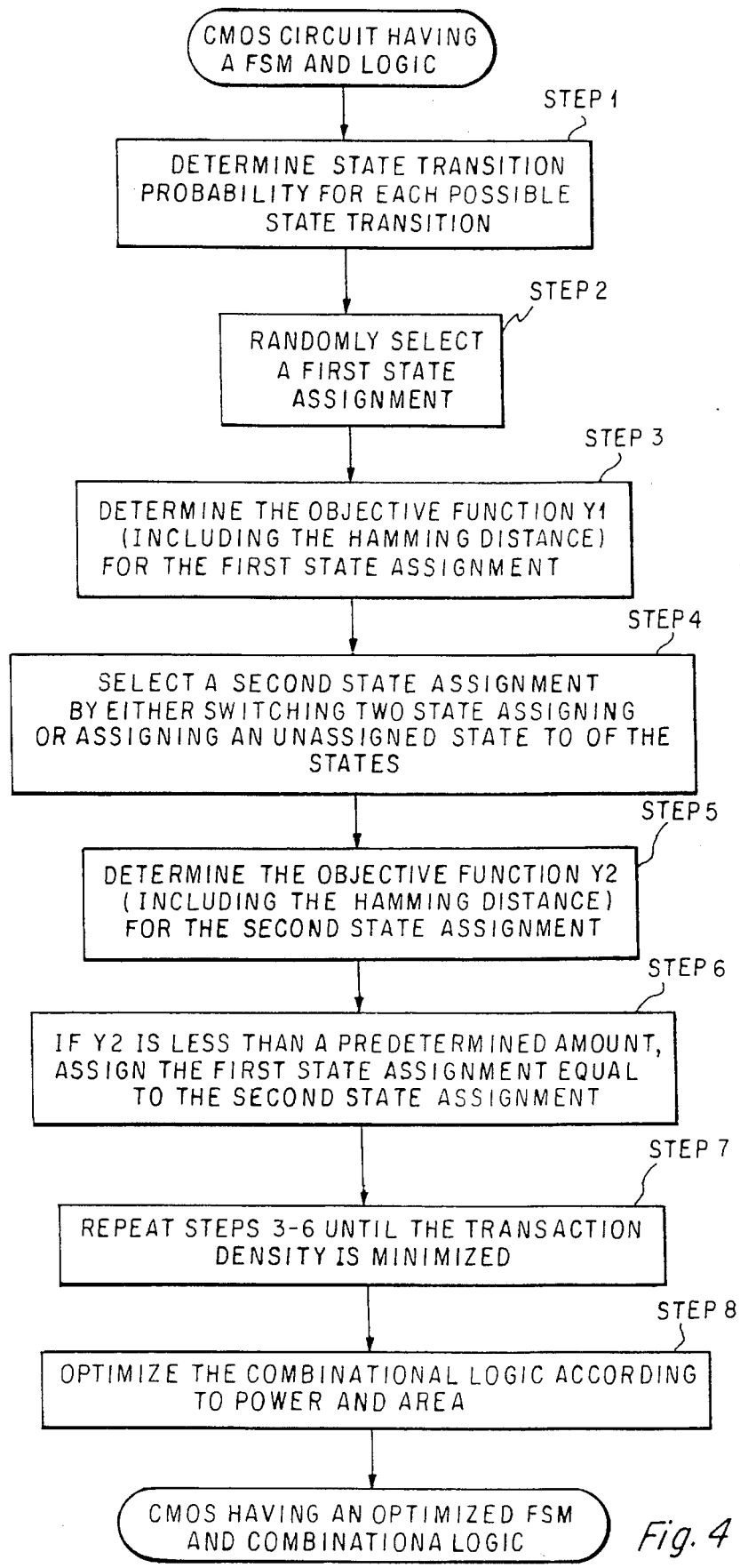
FIG. 4 is a flow diagram of the preferred embodiment of the invention.

Referring to FIG. 4, the problem of encoding of states of synchronous sequential machines based on input signal probabilities and transition densities will now be discussed. The state encoding scheme uses the likelihood of state transition information. Accordingly, the state transition probability, $P_{ij}$, for each possible state transition must be determined (Step 1). Referring to FIG. 2, state $S_1$ has three outgoing and three incoming edges. Assume that $p_{12}$ is much greater than both $p_{13}$ and $p_{14}$. It is clear that $p_{51}=p_{61}=p_{21}=1$, because there is one outgoing edge from each of the states $S_5$, $S_6$ and $S_2$, and the machine is assumed to be completely specified. Hence, the likelihood of state transition from state $S_1$ to $S_2$, or vice versa, is the maximum. Therefore, states $S_1$ and $S_2$ should be assigned codes such that there are minimum number of transitions between these two states, i.e. $H(S_1,S_2)$ should be minimum. For example, if state $S_1$ is assigned a four bit code of '0000' and state $S_2$ is assigned a four bit code of '1000', then $H(S_1,S_2)=1$. When there is a transition from $S_1$ to $S_2$, only one flip-flop of FIG. 1 will undergo transition from a logic value of 0 to 1. However, if $S_2$ is assigned a code of '1111' instead of '0000', then $H(S_1,S_2)=4$ and all the four flip-flops will undergo a transition from 0 to 1.

Let $p_{ij}$ and $L_{ij}$ respectively denote the conditional state transition probability (given that the FSM is in state $S_i$, $p_{ij}$ is the probability that the next state is $S_j$) and the label associated with an edge $S_i$-$S_j$ of a PSTG with $N_I$ primary inputs each having a signal probability of $P_x$, $x \leq N_I$. Each primary input x in $L_{ij}$, which causes the state transition to occur, can assume a logic value value(x), from the set $\{1,0,-\}$, where '-' represents the don't care condition. $P_x$ is the probability that value(x)=1. Hence, $(1-P_x)$ denotes the probability that value(x)=0. The condition, value(x)='-' obviously occurs with a probability of 1. Therefore, the state transition probability $p_{ij}$ is given by $$p_{ij} = \prod_{x \in \text{inputs in } L_{ij}} W_x$$

where $$W_x = P_x, \text{ if value}(x) = 1$$
$$= 1 - P_x, \text{ if value}(x) = 0$$
$$= 1, \text{ if value}(x) = {'-'}$$

If input signal probabilities $P_k$ are unknown, the user can assume that logic values ZERO and ONE are equally likely, and hence $P_k=0.5$.

If there are $N_s$ states, then the minimum number of flip-flops required for coding is $[\log_2 N_s]$. It should be noted that if one-hot coding with $N_s$ flip-flops are used, the Hamming distance between any two states are always 2, and hence, an optimum assignment to minimize the number of switching at the present state inputs might not be obtainable. Be sides, one-hot coding also increases the number of present state inputs to the combinational logic of FIG. 1. The average number of switching at the present state inputs to a state machine can be minimized if the state assignment scheme is such that the following activity number is minimized:

$$\gamma = \sum_{\substack{\text{over all} \\ \text{edges}}} p_{ij} H(S_i, S_j)$$

The above function represents the summation of all Hamming distances between two adjacent states weighted by the state transition probability. The higher the state transition probability between two states, the lower should be the Hamming distance between those two states.

Due to the complex nature of the activity number $\gamma$, for state assignment, simulated annealing was used to solve the problem. First, a random assignment of states with the prescribed number of bits is chosen (Step 2). Next, the activity number $\gamma$ may be determined for the random assignment (Step 3). Two types of moves are allowed during annealing to create a new assignment possibility (Step 4): interchange the codes of two states, or assign an unassigned code to the state which is randomly picked for exchange. The activity number $\gamma$ may then be determined for the new assignment possibility (Step 5). The move is accepted (Step 6) if the new assignment decreases $\gamma$. If the move increases the value of the activity number, the move is accepted with a probability of $$e^{\frac{-|\delta(\gamma)|}{Temp}}$$

where $|\delta(\gamma)|$ is the absolute value of the change in the activity number, and Temp denotes the annealing temperature. When Temp is high, moves which increases $\gamma$ are accepted with a higher probability so that the solution does not get stuck at any local minima. As the annealing temperature decreases, the probability of accepting such a move decreases. Steps 4–6 are then repeated (Step 7) until the transition density is minimized.

FIG. 5 shows a state machine which produces an output of ONE whenever a sequence of five ONEs appear, else it outputs a ZERO. The machine was implemented using three D type flip-flops using the two assignment schemes shown in the table. The input signal probability is assumed to be 0.5, and hence, each edge of the state transition graph has a state transition probability of 0.5. For Coding 1, $\gamma$, is 10, whereas, for Coding 2, $\gamma$ is 5.5. The machines can be implemented using 34 transistors and 3 flip-flops and 36 transistors and 3 flip-flops respectively. As will be discussed below, SPICE with random inputs show that the time average power dissipated with the first encoding is more than the second one.

State assignment determines the functionality of combinational logic. The combinational logic is represented by F(I, V), where I is the set of primary inputs, and V represents the present state inputs (refer to FIG. 1). The signal probabilities and transition densities are given for each input $i_k$ $\in$ I.

Given the combinational logic F(I, V), the signal probabilities and transition densities for the V inputs have to be determined in order to synthesize multi-level combinational logic based on power dissipation measure. The V inputs are the same as U outputs, but delayed by a clock period. Hence, for a steady state stationary companion process, the signal probabilities and the transition densities of V inputs are equal to the corresponding values for the U outputs. After state assignment, the state machine is simulated with different inputs to determine the signal probabilities and transition densities at the present state inputs.

The simulation proceeds as follows. Primary input signals are randomly generated such that the signal probabilities and transition densities conform to given distribution. The state machine is simulated to determine the percentage of time bit $v_j$ of the state machine has a logical value of ONE. Similarly, the number of transitions occurring at bit $v_j$ of the machine is also determined. The number of transitions divided by the total number of simulations gives transition density at input $D(v_j)$. The unit of $D(v_j)$ is transitions per clock period. The simulations can be carried out very fast because of the way the primary input signals are generated.

Once the state assignment is optimized, the multi-level combinational logic is synthesized. Preferably, the multi-level logic is optimized for both area and power as described in co-pending U.S. patent application Ser. No. 08/018,984 filed Feb. 18, 1993, assigned to TI and hereby incorporated by reference. Briefly, the combinational logic synthesis finds multiple cube common divisors or single cube common divisors among two or more nodes. A set of kernels are computed for each logic expression. Then the non-trivial intersection among kernels from different functions are formed. While choosing the best intersection, both the reduction in literal count and the reduction in power dissipation measure $\Phi$ that will occur if we choose that factor are considered. Both level 0 and higher level kernels are generated. The best N kernel intersections on the basis of literal count reduction are chosen, and among them the one which gives the best trade-off between area and power reduction is selected.

When the best N factors are chosen on the basis of reductions in literal count, the reduction in the power dissipation measure Φ is also calculated. The best factor is chosen by using a saving function S. For the calculation of the reduction in Φ, one implementation would involve putting the factor as a node in the network, subsequently dividing all the nodes for which this new node can be a factor, then calculating Φ, and finally removing the node from the network along with all its effect on the network. Choosing the best factor out of N choices using the above method may be expensive from computational point of view. However, preferably the power dissipation due to transitions at circuit node local to the factor under consideration are computed. This value is used to compute a power savings ΔΦ similar to the area savings ΔA. The total savings is given by $$S = \mu * \frac{\Delta \Phi}{\Phi} + (1-\mu) * \frac{\Delta A}{A}$$

where $$\frac{\Delta A}{A} \text{ and } \frac{\Delta \Phi}{\Phi}$$

represents the fractional change in area and Φ respectively. µ denotes the relative weight factor defined by the user, which reflects the relative importance of the reduction in power dissipation measure with respect to area savings.

The synthesis problem is broken up into two parts—the state assignment problem where the activity number γ is minimized so as to reduce the transition densities at the present state inputs V, and the multilevel combinational logic synthesis proc2ess based on power dissipation measure and area. The state assignment and the subsequent logic synthesis process can get greatly affected if the primary input signal probabilities and transition densities are altered.

The algorithms for state assignment and logic synthesis have been implemented in LISP on an Explorer workstation. Table 1 shows the results of the state assignment scheme according to the preferred embodiment on the MCNC benchmark examples. The number of states, primary inputs, primary outputs, and the number of edges in the state transition graph are shown in the Table. For all primary inputs, a signal probability of 0.5 and a transition density of 0.5 transition per clock cycle were assumed. It should be noted that a different state assignment will be obtained if the input signal probabilities are changed. The state machines were experimented with the $\lceil \log_2 S \rceil$ state bits, which is the minimum number of bits required to code the state machine. Larger number of bits for state assignment will produce more present state inputs, but the complexity of the combinational logic usually reduces. The minimum value of the activity number $\gamma_{min}$ obtained by the simulated annealing based state assignment is shown in the Table. For comparison $\gamma_{max}$ is also shown in Table 1.

TABLE 1

Results on benchmark examples with minimum coding bits

| example | states | input | output | edges | γmin | γmax |
|---|---|---|---|---|---|---|
| ex1 | 20 | 9 | 19 | 138 | 25.5 | 40.03 |
| ex3 | 10 | 2 | 2 | 36 | 16.25 | 23.25 |

TABLE 1-continued

Results on benchmark examples with minimum coding bits

| example | states | input | output | edges | γmin | γmax |
|---|---|---|---|---|---|---|
| ex7 | 10 | 2 | 2 | 36 | 13.75 | 21.75 |
| keyb | 19 | 7 | 2 | 170 | 68.1 | 145.8 |
| sand | 32 | 11 | 9 | 184 | 37.48 | 57.65 |
| train11 | 11 | 2 | 1 | 25 | 5.5 | 10.75 |
| opus | 10 | 5 | 6 | 22 | 6.59 | 13.15 |
| bbtas | 6 | 2 | 2 | 24 | 3.5 | 8.75 |
| lion9 | 9 | 2 | 1 | 25 | 5.0 | 12.0 |
| bbara | 10 | 4 | 2 | 60 | 3.5 | 5.8 |
| planet | 48 | 7 | 19 | 115 | 110.81 | 172.875 |

The signal probabilities and transition densities at the V inputs to the combinational logic to be used in the multilevel synthesis are determined after state assignment using simulation. 10,000 randomly generated primary inputs (conforming to a given distribution) were simulated. Table 2 shows the results of applying the synthesis algorithm or the preferred embodiment to the MCNC benchmark examples of Table 1. Two types of circuits were synthesized for comparisons. The second and the third column shows the transistor count and the power dissipation measure Φ of the circuits synthesized using the state encoding scheme which produces an activity number of $\gamma_{min}$. Similar results for circuits encoded with states which produced $\gamma_{max}$ as activity number are shown next for comparison. In both cases, the combinational logic was synthesized to minimize power dissipation measure. The results show that the difference in power dissipation measure can be large for most of these circuits. For example, though the increase in transistor count between the two representations of ex1 is 13%, the increase in power dissipation measure is 33%. It should be observed that most of these state machines were incompletely specified. Because the preferred embodiment considers completely specified machines for synthesis, the machines were completely specified by introducing self loops where required to take care of don't care inputs.

TABLE 2

Synthesis Results

| | γmin | | γmax | |
|---|---|---|---|---|
| example | transistors | Φ | transistors | Φ |
| ex1 | 2072 | 984.4 | 2380 | 1465.2 |
| ex3 | 284 | 46.4 | 344 | 55.3 |
| ex7 | 304 | 48.8 | 404 | 62.8 |
| keyb | 1364 | 561.4 | 2424 | 1170.4 |
| sand | 2958 | 1497.1 | 3040 | 1503.4 |
| train11 | 418 | 101.3 | 466 | 151.3 |
| opus | 452 | 160.1 | 530 | 234.2 |
| bbtas | 90 | 20.2 | 130 | 55.2 |
| lion9 | 276 | 66.9 | 374 | 131.1 |
| bbara | 290 | 69.0 | 342 | 105.4 |
| planet | 2650 | 2012.0 | 3226 | 3854.9 |

The example state machine of FIG. 5 which outputs a ONE only when a sequence of five ONES appear at the input was synthesized using the two encodings shown in the Figure. Input signal probability of 0.5 and a transition density of 0.5 transitions per unit clock period was assumed. With the same inputs, and 0.8 micron technology the two machines were simulated with 1000 inputs using SPICE. FIG. 6 shows time average power for the two machines. Coding 1 for which γ is higher produced more power dissipation than the one with lower γ.

In conclusion, the synthesis system of the preferred embodiment has been developed to synthesize both finite state machines and combinational logic for low power applications. It tries to minimize the transition density at the internal nodes of a circuit to minimize power dissipation during normal operation. As input signal probabilities and transition densities are considered during the synthesis process, a particular circuit can be synthesized in different ways for different applications which require different types of inputs. For the present state inputs to the combinational circuit of a state machine, simulation was used to determine the signal probabilities and transition densities. [$\log_2 S$] number of bits were used for state assignment. However, the invention is not limited by the number of bits used for state assignment. The multilevel optimization process extracts kernels such that there is a balance between area and power optimization.

A few preferred embodiments have been described in detail hereinabove. It is to be understood that the scope of the invention also comprehends embodiments different from those described, yet within the scope of the claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for optimizing a finite state machine (FSM) by minimizing a unit number of transitions per unit time (transition density) comprising the steps of:
   a. assigning a first state assignment for each of said states, said first state assignment consisting of a Boolean number of given length;
   b. determining a first transition density characteristic associated with the first state assignment;
   c. assigning a second state assignment, different from said first state assignment for each state of said FSM, said second state assignment consisting of Boolean number of said given length;
   d. determining a second transition density characteristic associated with the second state assignment;
   e. assigning the first state assignment equal to the second state assignment if second transition density characteristic is less than a predetermined amount greater than said first transition density characteristic;
   f. repeating steps c through e until there is no second state assignment having a second transition density characteristic less than said first transition density characteristic.

2. The method of claim 1, further comprising the step of determining a state transition probability for each of a plurality of state transitions, wherein said step of determining said first transition density characteristic incorporates said state transition probabilities.

3. The method of claim 2, wherein said step of determining a first transition density characteristic comprises the steps of:
   a. determining the hamming distance for each state transition; and
   b. determining y1 for the first state assignments, wherein y1 is the first transition density characteristic.

4. The method of claim 3, wherein said step of determining a second transition density characteristic comprises the steps of:
   a. determining the hamming distance for each state transition; and
   b. determining y2 for the second state assignments, wherein y2 is the second transition density characteristic.

5. The method of claim 4, wherein the hamming distance is determined according to the following formula:

$$H(S_i, S_j) = J(S_i \oplus S_j)$$

6. The method of claim 4, wherein y1 is determined according to the following formula:

$$\gamma_1 = \Sigma\, p_{ij}\, H(S_i, S_j)$$

7. The method of claim 4, wherein y2 is determined according to the following formula:

$$\gamma_2 = \Sigma\, p_{ij}\, H(S_i, S_j)$$

8. A method for optimizing state assignments for a finite state machine (FSM) having a plurality of states, comprising the steps of:
   a. determining a state transition probability for each of a plurality of state transitions;
   b. creating a first state assignment for each of said states, said first state assignment consisting of a number of binary bits;
   c. determining the hamming distance for each state transition;
   d. determining y1 for the first state assignments, using said state transition probabilities;
   e. changing the state assignment for at least one but no more than two states such that no two states have the same state assignment to create a second state assignment for each of said states;
   f. determining the hamming distance for each state transition using the second state assignments;
   g. determining y2 for the second state assignment;
   h. assigning the first state assignment equal to the second state assignment if y2 is less than a predetermined amount greater than y1;
   i. repeating steps c through h until there is no second state assignment having a y2 less than y1.

9. The method of claim 8, wherein the hamming distance is determined according to the following formula:

$$H(S_i, S_j) = J(S_i \oplus S_j)$$

10. The method of claim 8, wherein y1 is determined according to the following formula:

$$\gamma_1 = \Sigma\, p_{ij}\, H(S_i, S_j)$$

11. The method of claim 8, wherein y2 is determined according to the following formula:

$$\gamma_2 = \Sigma\, p_{ij}\, H(S_i, S_j)$$

12. The method of claim 8, wherein the step of changing the state assignment of at least one state comprises the step of interchanging the state assignments of two states.

13. The method of claim 8, wherein the step of changing the state assignment of at least one state comprises the step of assigning an unassigned state assignment to one of said states.

14. A method for optimizing a CMOS circuit having a finite state machine (FSM) and multilevel combinational logic, comprising the steps of:
   a. assigning an initial state assignment to each state of said FSM, said initial state assignment consisting of a Boolean number of a given length;

b. modifying said initial state assignments to cream an optimized state assignment for each state that minimizes a unit number of transitions per unit time (transition density), by performing the following steps:
  i. creating an intermediate state assignment equal to the initial state assignment;
  ii. determining the state transition probability for each transition possibility of each state;
  iii. determining a Hamming distance for each transition possibility associated with the intermediate state assignments; and
  iv. determining y1 associated with the intermediate state assignments using said state transition probability;
  v. determining a temporary state assignment;
  vi. determining the Hamming distance for each output possibility using the temporary state assignments;
  vii. determining y2 for the temporary state assignment;
  viii. assigning the intermediate assignment equal to the temporary assignment if y2 is less than a predetermined amount greater than y1;
  ix. repeating steps c through h until there is no temporary assignment having a y2 less than y1; and
  x. assigning the optimized state assignment equal to the intermediate state assignment; and
c. optimizing the multilevel combination logic for area and power.

* * * * *